US012587823B2

(12) United States Patent
Hou et al.

(10) Patent No.: US 12,587,823 B2
(45) Date of Patent: Mar. 24, 2026

(54) METHODS AND SYSTEMS FOR DEVICE DETECTION

(71) Applicant: Comcast Cable Communications, LLC, Philadelphia, PA (US)

(72) Inventors: Jiongkuan Hou, Philadelphia, PA (US); Ping Yi, Philadelphia, PA (US); Thomas McClung, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 399 days.

(21) Appl. No.: 18/147,324

(22) Filed: Dec. 28, 2022

(65) Prior Publication Data

US 2024/0224018 A1 Jul. 4, 2024

(51) Int. Cl.
*H04W 8/00* (2009.01)
*H04W 8/26* (2009.01)

(52) U.S. Cl.
CPC ............. *H04W 8/005* (2013.01); *H04W 8/26* (2013.01)

(58) Field of Classification Search
None
See application file for complete search history.

(56) References Cited

U.S. PATENT DOCUMENTS

| | | | |
|---|---|---|---|
| 7,706,369 B2 | 4/2010 | Roese et al. | |
| 8,671,184 B2 | 3/2014 | Bush et al. | |
| 8,755,331 B2 | 6/2014 | Boland et al. | |
| 8,774,056 B2 | 7/2014 | Lueckenhoff et al. | |
| 9,661,557 B2 | 5/2017 | Balasubramanian et al. | |
| 9,858,595 B2 | 1/2018 | Barnes, Jr. | |
| 9,877,237 B2 | 1/2018 | Nuss et al. | |
| 10,263,863 B2 | 4/2019 | Mukerji et al. | |
| 10,999,179 B2 | 5/2021 | Kanevsky | |
| 2007/0115883 A1 | 5/2007 | Narayanan et al. | |
| 2010/0241744 A1 | 9/2010 | Fujiwara | |
| 2015/0244586 A1* | 8/2015 | Lee ..................... H04L 41/0806 | |
| | | | 709/223 |
| 2021/0029753 A1* | 1/2021 | Gladish ............... H04W 40/248 | |

\* cited by examiner

*Primary Examiner* — Frantz Bataille
(74) *Attorney, Agent, or Firm* — Ballard Spahr LLP

(57) ABSTRACT

Methods, apparatuses, and systems are described for detecting the presence, location and movement of devices and associated users between networks. A device may determine and maintain data indicative of one or more devices in communication with a gateway device associated with a network in order to determine whether the device has been moved. The device may compare the data indicative of the devices in communication with the gateway device with other data indicative of devices detected at a second time to determine if the device has been moved to a new network.

20 Claims, 9 Drawing Sheets

Figure 5:
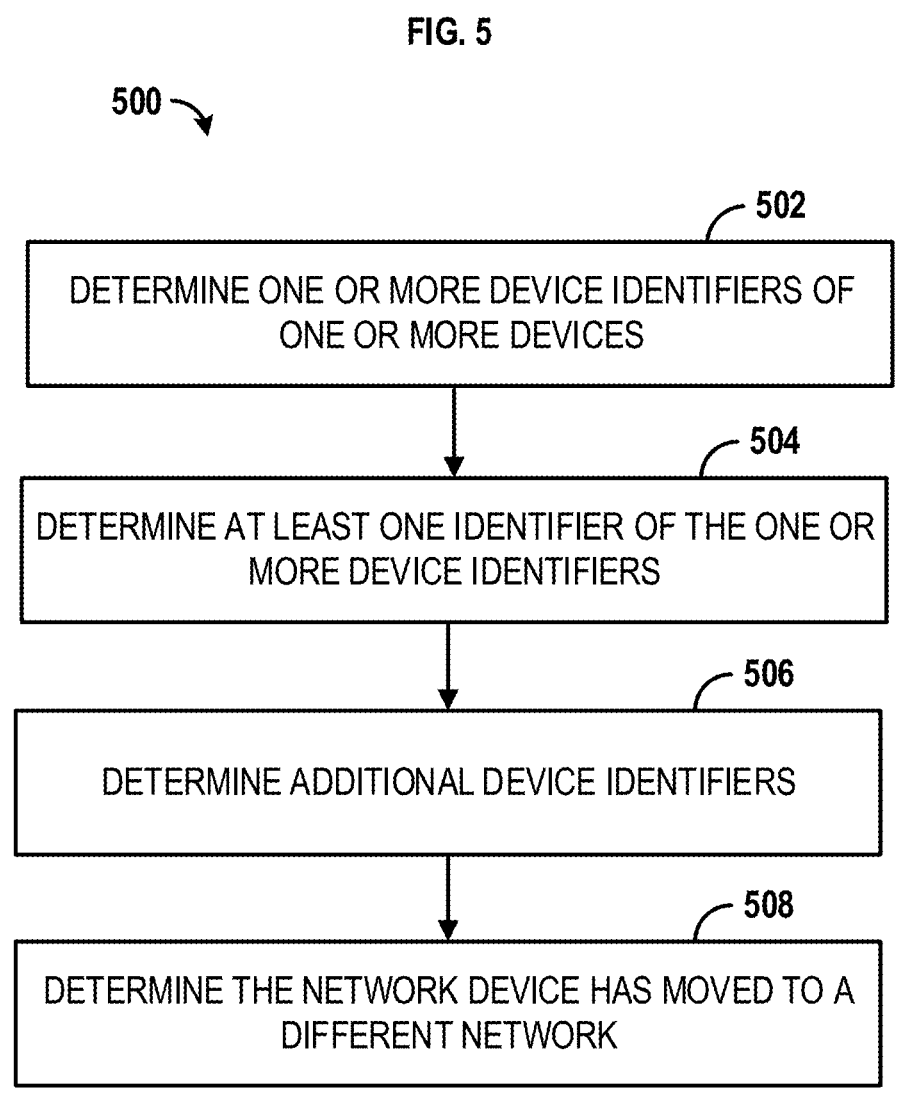

DETERMINE ONE OR MORE DEVICE IDENTIFIERS OF ONE OR MORE DEVICES

504

DETERMINE AT LEAST ONE IDENTIFIER OF THE ONE OR MORE DEVICE IDENTIFIERS

506

DETERMINE ADDITIONAL DEVICE IDENTIFIERS

508

DETERMINE THE NETWORK DEVICE HAS MOVED TO A DIFFERENT NETWORK

FIG. 8

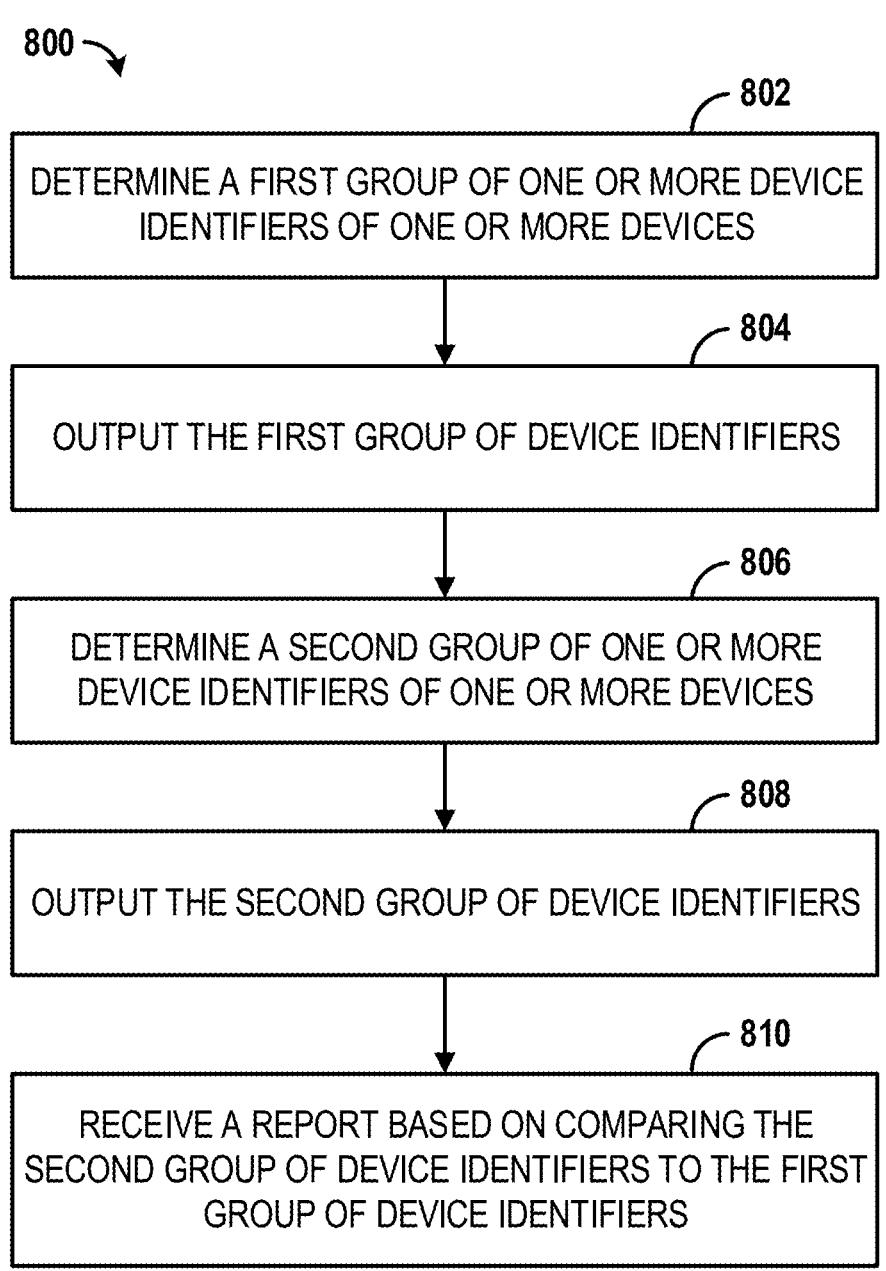

800

802

DETERMINE A FIRST GROUP OF ONE OR MORE DEVICE IDENTIFIERS OF ONE OR MORE DEVICES

804

OUTPUT THE FIRST GROUP OF DEVICE IDENTIFIERS

806

DETERMINE A SECOND GROUP OF ONE OR MORE DEVICE IDENTIFIERS OF ONE OR MORE DEVICES

808

OUTPUT THE SECOND GROUP OF DEVICE IDENTIFIERS

810

RECEIVE A REPORT BASED ON COMPARING THE SECOND GROUP OF DEVICE IDENTIFIERS TO THE FIRST GROUP OF DEVICE IDENTIFIERS

METHODS AND SYSTEMS FOR DEVICE DETECTION

BACKGROUND

Devices, such as Internet of Things (IOT) or Voice over Internet Protocol (VOIP) devices, can connect to various networks that provide services outside of the users' homes, inside their homes or office, or elsewhere. This creates difficulties for service providers tasked with detecting device movement or otherwise monitoring device location in in order to comply with service related regulations, policy, or security requirements. For example, e911 services may be difficult to dispatch if the physical location of an IP phone is not known or if the IP phone has been moved from the location known to the service provider. These and other shortcomings are identified and addressed by the disclosure.

SUMMARY

It is to be understood that both the following general description and the following detailed description are exemplary and explanatory only and are not restrictive. Methods, systems, and apparatuses systems for determining a location of devices in one or more networks are described.

A device (e.g., a network device, a user device, etc.) may detect other devices on the same network. The other devices that are consistently detected may be considered usual devices of the network. The device may generate and/or maintain data indicative of the usual devices of the network. The data may be used to determine whether the device has changed networks. The device may generate and/or maintain other data indicative of other usual devices connected to other networks. The device may determine whether or not it has moved between networks based on the usual devices that are detected.

This summary is not intended to identify critical or essential features of the disclosure, but merely to summarize certain features and variations thereof. Other details and features will be described in the sections that follow.

BRIEF DESCRIPTION OF THE DRAWINGS

The accompanying drawings, which are incorporated in and constitute a part of the present description serve to explain the principles of the apparatuses and systems described herein:

FIG. 5 shows a flowchart of an example method;

FIG. 8 shows a flowchart of an example method; and

DETAILED DESCRIPTION

Figure 1:
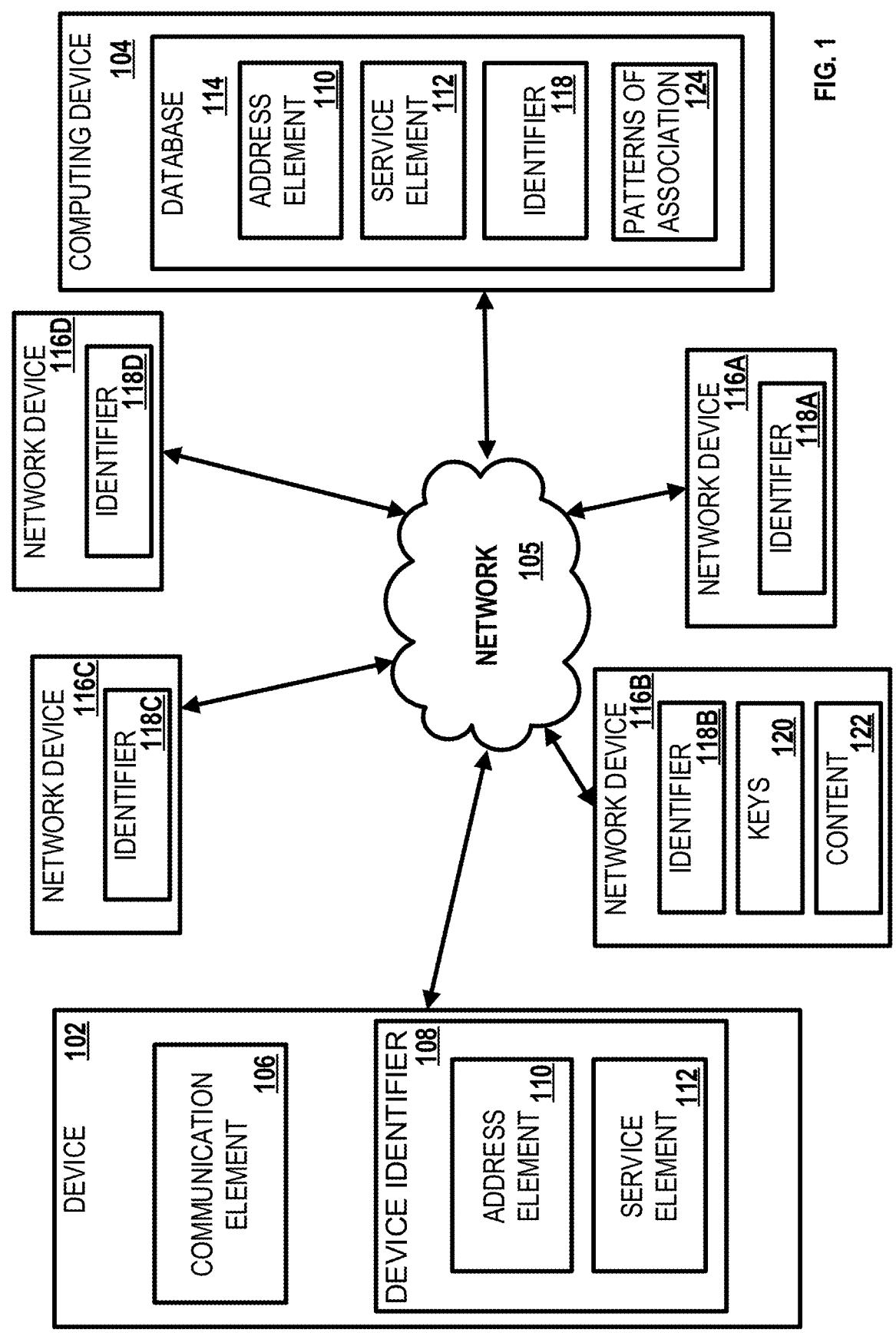
FIG. 1 shows an example system for creating and maintaining data indicative of one or more devices connected to a network.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. When values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, magnetic storage devices, memresistors, Non-Volatile Random Access Memory (NVRAM), flash memory, or a combination thereof.

Throughout this application reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Accordingly, blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

This detailed description may refer to a given entity performing some action. It should be understood that this language may in some cases mean that a system (e.g., a computer) owned and/or controlled by the given entity is actually performing the action.

FIG. 1 shows an example system 100 for detecting a movement of a device (e.g., a device 102, computing device 104, and/or network devices 116A-116D). For example, the system 100 may be configured to determine data indicative of devices connected to the same network and use the data to determine whether a device has moved to a different network. The system 100 may be configured to provide services, such as network-related services, to a device. The network and system may comprise a device 102 in communication with a computing device 104, such as a server, via a network 105. The computing device 104 may be disposed locally or remotely relative to the device 102. As an example, the device 102 and the computing device 104 may be in communication via a private and/or public network 105 such as the Internet or a local area network (LAN). Other forms of communications can be used such as wired and wireless telecommunication channels, for example.

The device 102 may comprise a user device and/or a network device, such as an Internet of Things (IOT) device (e.g., sensor, a mobile phone, etc.). The user device may comprise an electronic device such as a computer, a smartphone, a laptop, a tablet, a set top box, a display device, or other device capable of communicating with the computing device 104. The user device may comprise computer premises equipment that may be configured to enable the user to connect to an OTT service. For example, the computer premises equipment may comprise devices such as VOIP devices, routers, printers, WiFi speakers, security cameras, or smart assistant devices (e.g. Alexa, Nest, Ring, etc.). The network device may comprise a gateway device, an access point, or a wireless access point.

As an example, the device 102 may comprise a communication element 106 for providing an interface to a user to interact with the device 102 and/or the computing device 104. The communication element 106 can be any interface for presenting and/or receiving information to/from the user, such as user feedback. For example, an interface may comprise a communication interface such as a web browser (e.g., Internet Explorer®, Mozilla Firefox®, Google Chrome®, Safari®, or the like). Other software, hardware, and/or interfaces may be used to provide communication between the user and one or more of the device 102 and the computing device 104. As an example, the communication element 106 may request or query various files from a local source and/or a remote source. As an example, the communication element 106 may transmit data to a local or remote device such as the computing device 104.

The device 102 may be associated with a user identifier or a device identifier 108. For example, the device identifier 108 may be any identifier, token, character, string, or the like, for differentiating one user or user device (e.g., device 102) from another user or user device. In an example, the device identifier 108 may identify a user or user device as belonging to a particular class of users or user devices. In an example, the device identifier 108 may comprise information relating to the device 102 such as a manufacturer, a model or type of device, a service provider associated with the device 102, a state of the device 102, a locator, and/or a label or classifier. Other information can be represented by the device identifier 108.

The device identifier 108 may comprise an address element 110 and a service element 112. The address element 110 may comprise or provide an internet protocol address, a network address, a media access control (MAC) address, international mobile equipment identity (IMEI) number, international portable equipment identity (IPEI) number, an Internet address, or the like. As an example, the address element 110 can be relied upon to establish a communication session between the device 102 and the computing device 104 or other devices and/or networks. As an example, the address element 110 can be used as an identifier or locator of the device 102. As an example, the address element 110 can be persistent for a particular network.

The service element 112 may comprise an identification of a service provider associated with the device 102, with the class of device 102, and/or with a particular network 105 with which the device 102 is currently accessing services associated with the service provider. The class of the device 102 may be related to a type of device, capability of device, type of service being provided, and/or a level of service (e.g., business class, service tier, service package, etc.). As an example, the service element 112 may comprise information relating to or provided by a communication service provider (e.g., Internet service provider) that is providing or enabling data flow such as communication services to the device 102. As an example, the service element 112 may comprise information relating to a preferred service provider for one or more particular services relating to the device 102. In an example, the address element 110 can be used to identify or retrieve data from the service element 112, or vice versa. As an example, one or more of the address element 110 and the service element 112 may be stored remotely from the device 102 and retrieved by one or more devices such as the device 102 and the computing device 104. Other information may be represented by the service element 112.

The device 102 may be configured to determine and maintain data indicative of devices, or device identifiers of the devices, connected to the same network 105 (e.g., network neighbors list), such as network devices 116A-116D. Although it is described that the device 102 is used for determining the data indicative of the devices connected to the same network, it is contemplated that any other device on the network may determine the data indicative of the devices connected to the same network, such as the network devices 116A-11D and/or the computing device 104 for example. For example, each device on the network may report up to the server which network the device is connected to, wherein the server may determine the data indicative of the devices connected to the same network. The device 102 may detect the existence of these network devices, and use that information to determine whether the device 102 has been moved to a different network. The device 102 may detect the devices connected to the network 105 by monitoring Address Resolution Protocol (ARP) or Neighbor Discovery Protocol (NDP) messages on the network 105 and create a group of MAC addresses (hardware addresses) of the network devices. In an example, the device 102 may periodically ping the devices, perform echo exchanges, receive/transmit data to the devices, perform a presence check, or log into a gateway device to determine the devices connected to the network 105. The data indicative of the devices connected to the network may be saved in persistent memory such that it will not be erased when the device 102 reboots. The data indicative of the devices connected to the same network may comprise an ordered group (e.g., network neighbors list) of detected devices connected to the same network. For example, the device 102 may monitor the ARP/NDP messages continuously or on a regular basis and update the group by moving the most frequently detected devices (e.g., the network devices 116A-116D, computing device 104, etc.) to the top of the group. These devices that are detected the most frequently may be considered the usual neighbors of the network 105, and should gradually concentrate to the top of the group. For example, the highest ranked device will most likely be the default gateway/router of the network. The device 102 may check the group based on certain events, such as when the device 102 is rebooted, is turned off and then on, or detects a new device, or new device identifier. As an example, the device 102 may monitor the ARP/NDP messages and create a new group and compare the new group to the group previously saved or the device 102 may use the reverse ARP (RARP) method, if supported by the network, to check the responsiveness of each MAC address on the saved groups. If the "moved" criteria are met, the device 102 determines that it is currently connected to a different network, or that it has been moved. For example, the "moved" criteria may include that the default gateway/router MAC address does not exist on the current network or that the top three out of four usual neighbor devices cannot be detected on the current network. As an example, if the device's 102 location policy is "moved or not", such as for VoIP phones, the device 102 may update its group when it is connected to a new network, or if the policy is "home or not", such as a video streaming CPE, the device 102 may keep the group it created on the home network (e.g., during service activation). The "moved" criteria may be optimized through a machine-learning process using field data. The device 102 may report the findings to network servers, such as computing device 104, which may apply the "CPE moved" policies to the device 102. For example, the computing device 104 may update a 911 service address associated with the device 102 or the computing device 104 may update a subscription service associated with the device 102 based on the new network.

The computing device 104 may be configured to determine and maintain the data indicative of the devices connected to the same network to determine if a device has moved to a different network. The computing device 104 may comprise a server for communicating with the device 102. As an example, the computing device 104 may communicate with the device 102 for providing data and/or services. As an example, the computing device 104 may provide services, such as network (e.g., Internet) connectivity, network printing, media management (e.g., media server), content services, streaming services, broadband services, or other network-related services. As an example, the computing device 104 may allow the device 102 to interact with remote resources, such as data, devices, and files. As an example, the computing device 104 may be configured as (or disposed at) a central location (e.g., a headend, or processing facility), which may receive content (e.g., data, input programming) from multiple sources. The computing device 104 may combine the content from the multiple sources and may distribute the content to user (e.g., subscriber) locations via a distribution system.

The computing device 104 may be configured to manage the communication between the device 102 and a database 114 for sending and receiving data therebetween. As an example, the database 114 may store a plurality of files (e.g., web pages), user identifiers or records, or other information. As an example, the device 102 may request and/or retrieve a file from the database 114. As an example, the database 114 may store information relating to the device 102 such as the address element 110 and/or the service element 112. As an example, the computing device 104 may obtain the device identifier 108 from the device 102 and retrieve information from the database 114 such as the address element 110 and/or the service elements 112. As an example, the computing device 104 may obtain the address element 110 from the device 102 and may retrieve the service element 112 from the database 114, or vice versa. Any information may be stored in and retrieved from the database 114. The database 114 may be disposed remotely from the computing device 104 and accessed via direct or indirect connection. The database 114 may be integrated with the computing device 104 or some other device or system.

The computing device 104 may be configured to determine and maintain the data indicative of the devices connected to the same network. In an example, the device 102 may send its data indicative of the devices connected to the network to the computing device 104, wherein the computing device 104 may compare the device's 102 data that is indicative of the devices connected to the network to the computing device's 104 data that is indicative of the devices connected to the network in order to determine if the device 102 has moved to a new network. In an example, the device 102 may be configured to send multiple requests at specified intervals to a computing device for the computing device's data that is indicative of the devices connected to the computing device's network. The device 102 may send an initial request, to an initial computing device and save the data received from the initial computing device. The device 102 may then compare the initial (e.g., old) data stored on the device 102 to the new data that may be received at different times and report the results of the comparison to the computing device it is currently connected to. For example, the device 102 may have gone through a reboot or a power-cycle event, and thus, needs to send a request for data that is indicative of the devices connected to the network to determine if it has moved to a new/different network. The device 102 may determine that "moved" criteria has been met after comparing the most recent data it obtained from a second computing device with the initial/old data saved on the device 102. For example, the second computing device may be connected to another network, and thus, its stored data indicative of the devices connected to its network may contain different devices than the devices grouped in the old data stored on the device 102. Based on comparing the new data with the old data, the device 102 may send a report, to the second computing device, indicating that the device 102 has moved to a different network.

One or more network devices 116A-116D may be in communication with a network, such as the network 105. In an example, similar to the device 102 discussed above, the networks device 116A-116D may comprise computer premises equipment that may be configured to enable the user to connect to an OTT service. For example, the computer premises equipment may comprise devices such as VOIP devices, routers, printers, WiFi speakers, security cameras, or smart assistant devices (e.g. Alexa, Nest, Ring, etc.). The network device 116A-116D may be configured, as discussed above with respect to the device 102, to determine and maintain the data indicative of the devices connected to the same network in order to determine if the network device 116A-116D has moved to a different network. The network device 116A-116D may detect the devices by monitoring ARP or NDP messages on the network 105 and create a group of MAC addresses (hardware addresses) of the devices. In an example, the network device 116A-116D may periodically ping the devices, perform echo exchanges, receive/transmit data to the devices, perform a presence check, or log into a gateway device to determine the devices connected to the network 105. The data indicative of the devices connected to the same network may be saved in persistent memory such that it will not be erased when the network device 116A-116D reboots. The data indicative of the devices connected to the same network may comprise an ordered group (e.g., network neighbors list) of detected devices connected to the same network. The network device 116A-116D may monitor the ARP/NDP messages continuously or on a regular basis and update the group by moving the most frequently detected devices (e.g., other network devices 116A-116D) to the top of the group. These devices that are detected the most frequently may be considered the usual neighbors of the network 105, and should gradually concentrate to the top of the group. For example, the highest ranked device will most likely be the default gateway/router of the network. The network device 116A-116D may check the group based on certain events, such as when the network device 116A-116D is rebooted, is turned off and then on, or detects a new device, or new device identifier. In an example, the network device 116A-116D may monitor the ARP/NDP messages and create a new group and compare the new group to the group previously saved or the network device 116A-116D may use the reverse ARP (RARP) method, if supported by the network, to check the responsiveness of each MAC address on the saved network neighbors groups. If the "moved" criteria are met, the network device 116A-116D may determine that it is currently connected to a different network, or that it has been moved. For example, the "moved" criteria may include that the default gateway/router MAC address does not exist on the current network or that the top three out of four usual network devices cannot be detected on the current network. In an example, if the network device's 116A-116D location policy is "moved or not", such as for VoIP phones, the network device 116A-116D may update its group when it is connected to a new network, or if the policy is "home or not", such as a video streaming CPE, the network device 116A-116D may keep the group it created on the home network (e.g., during service activation). The "moved" criteria may be optimized through a machine-learning process using field data. The network device 116A-116D may report the findings to network servers, such as computing device 104, which may apply the "CPE moved" policies to the network device 116A-116D. For example, the computing device 104 may update a 911 service address associated with the network device 116A-116D or the computing device 104 may update a subscription service associated with the network device 116A-116D based on the new network.

One or more of the network devices 116A-116D may facilitate the connection of a device, such as device 102, to the network 105. As an example, one or more of the network devices 116A-116D may be configured as a gateway device or wireless access point (WAP). In an example, one or more of the network devices 116A-116D may be configured to allow one or more wireless devices to connect to a wired and/or wireless network using Wi-Fi. Bluetooth®, Zigbee®, or any desired method or standard. For example, wherein a network device 116A-116D comprises a gateway device, the network device 116A-116D may be configured to perform similar steps, as those discussed with respect to the computing device 104 for determining and maintaining the data indicative of the devices connected to the same network. As an example, the network device 116A-116D may send its data to the gateway device 116, wherein the gateway device 116 may compare the network device's 116A-116D data to its data in order to determine if the network device 116A-116D has moved to a new network. As an example, the network device 116A-116D may be configured to send multiple requests, at a specified interval, to the gateway device 116 for the gateway device's 116 data indicative of the devices connected to its network, wherein the network device 116A-116D may compare the data received from the gateway device 116 at the specified intervals and report the results to the gateway device 116. For example, the network device 116A-116D may determine that "moved" criteria has been met after comparing the most recent data it obtained from the gateway device 116 with earlier data it obtained from the gateway device 116 and send a report, to the gateway device 116, indicating that the network device 116A-116D has changed networks.

One or more of the network devices 116A-116D may comprise an identifier 118A-118D. As an example, one or more identifiers may be or relate to an Internet Protocol (IP) Address (e.g., IPV4/IPV6) or a media access control address (MAC address) or the like. As an example, one or more of the identifiers 118A-118D may be a unique identifier for facilitating communications on the physical network segment. In an example, each of the network devices 116A-116D may comprise a distinct identifier 118A-118D. As an example, the identifiers 118A-118D may be associated with a physical location of the network devices 116A-116D.

Figure 2:
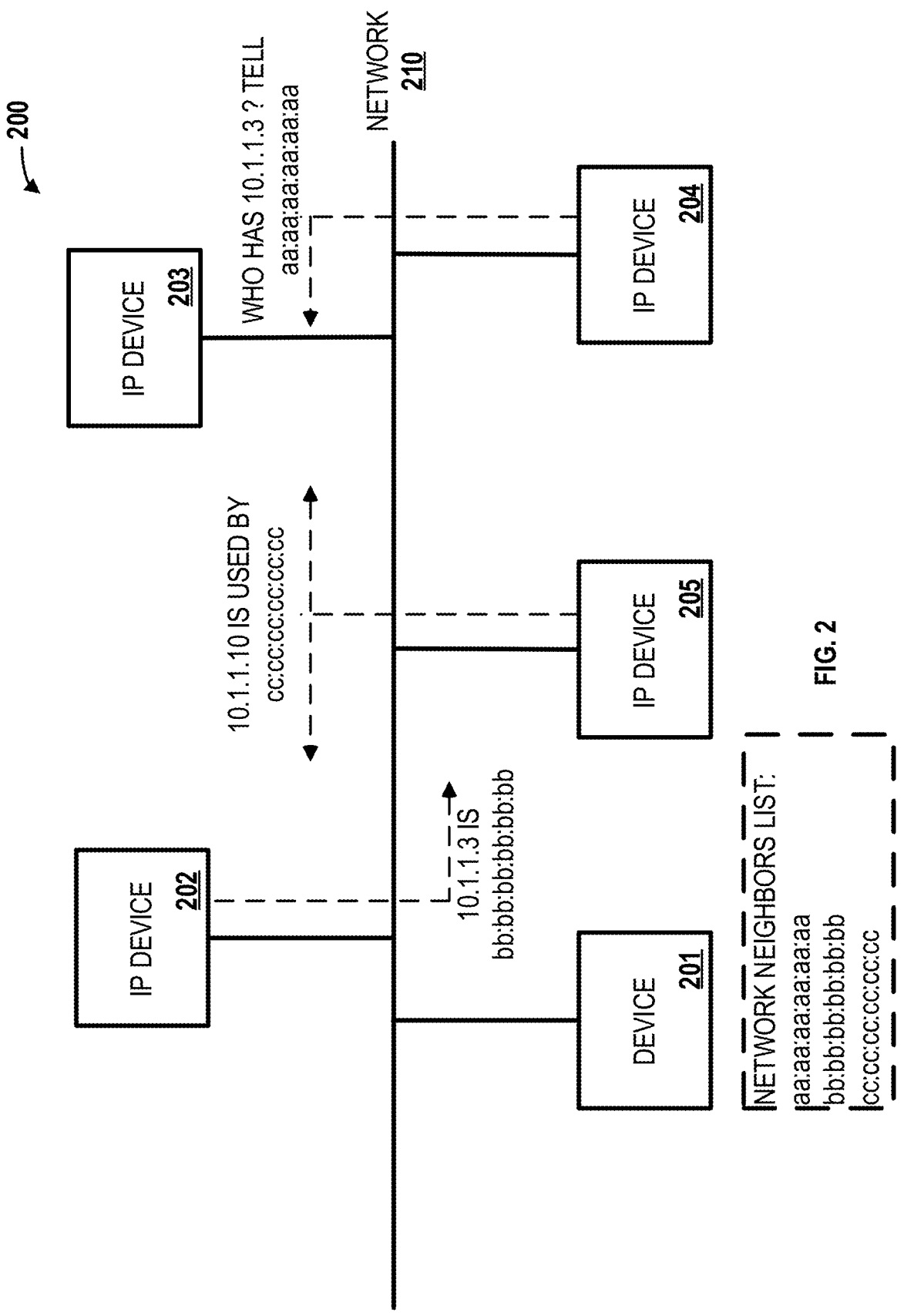
FIG. 2 shows an example network.

FIG. 2 shows an example network 210, wherein a device 201 creates and maintains data indicative of devices (e.g., a network neighbor list) connected to the network 210, wherein the network 210 may comprise a LAN, wireless LAN, or WAN. For example, the device 201 may monitor the ARP/NDP messages to determine that device identifiers aa:aa:aa:aa:aa:aa, bb:bb:bb:bb:bb:bb, and cc:cc:cc:cc:cc:cc belonging to IP devices 202, 204, and 205 are the device identifiers that can be detected on the current network, network 210. As an example, the device 201 may periodically ping the one or more devices on the network 210 to determine the device identifiers of the one or more devices on the network 210. As an example, the device 201 may cause an echo exchange of the one or more devices on the network 210 to determine the device identifiers of the one or more devices on the network 210. As an example, the device 201 may determine the one or more device identifiers of the one or more devices currently on the network 210 based on the receipt or transmission of data by the one or more devices. As an example, the device 201 may perform a presence check of the one or more devices on the network 210 to determine the device identifiers of the one or more devices on the network 210. As an example, the device 201 may determine the device identifiers of the one or more devices currently on the network 210 based on logging into a gateway device connected to the network 210. In an example, the first group of device identifiers may be stored in persistent memory such that the group will not be erased when the network device reboots. The data indicative of the devices connected to the network 210 may comprise an ordered group (e.g., network neighbors list) of detected devices connected to the same network. For example, after detecting the devices a threshold number of times, the device 201 may update the group by ranking the devices at the top of the group. These devices that are detected the most frequently may be considered the usual neighbors of the network 210.

Figure 3:
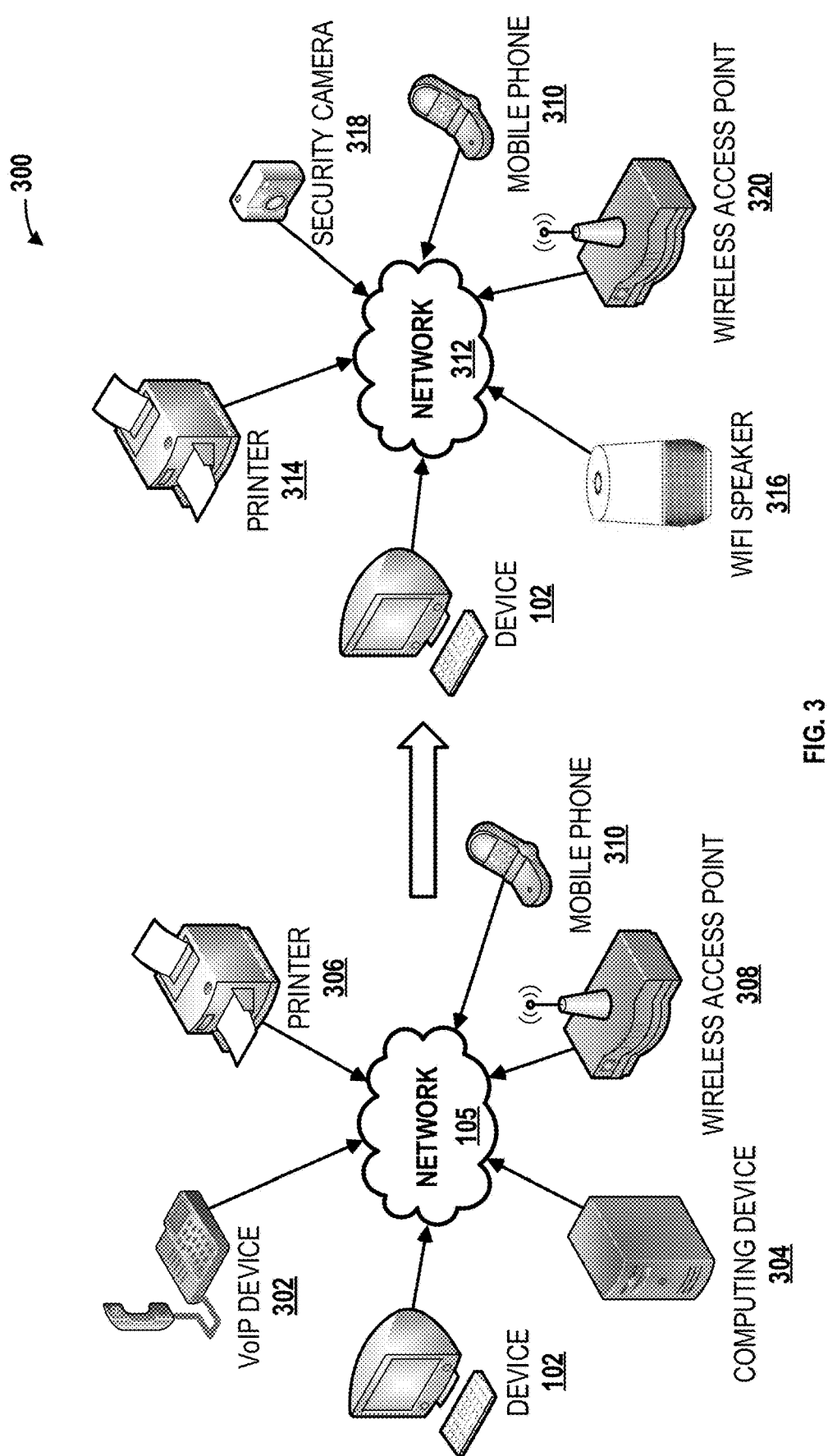
FIG. 3 shows an example scenario of a device moving from a first network to a second network.

FIG. 3 shows an example scenario, wherein the device 102, shown in FIG. 1, moves from a first network 105 to a second network 312. While the device 102 is connected to the first network 105, it may monitor the ARP/NDP messages to detect the devices connected to the first network 105. For example, the network device may monitor ARP or NDP messages on the first network to determine the device identifiers of the network devices currently connected to the first gateway device associated with the first network. As an example, the network device may periodically ping the one or more devices in communication with the first gateway device to determine the device identifiers of the one or more devices currently in communication with the first gateway device. As an example, the network device may cause an echo exchange of the one or more devices in communication with the first gateway device to determine the device identifiers of the one or more devices currently in communication with the first gateway device. As an example, the network device may determine the one or more device identifiers of the one or more devices currently in communication with the first gateway device based on the receipt or transmission of data by the one or more device. As an example, the network device may perform a presence check of the one or more devices in communication with the first gateway device to determine the device identifiers of the one or more devices currently in communication with the first gateway device. As an example, the network device may determine the device identifiers of the one or more devices currently in communication with the first gateway device based on logging into the first gateway device.

For example, the device 102 may detect the device identifiers of a VOIP device 302, a computing device 304, a printer 306, a wireless access point 308, and a mobile phone 310 while connected to the first network 105. Based on an event, such as a reboot, power cycling event, or the detection of a new device identifier, the device 102 may detect the device identifiers connected to the current network, such as the second network 312. The "moved" criteria for determining whether the device 102 has changed networks may be selected by the service provider based on historical data analysis. In an example, the service provider may select that the "moved" criteria comprises the absence of the original wireless access point device 308 in the original data indicative of the devices connected to the network. The device 102 may detect a new printer 314, a WiFi speaker 316, one or more security cameras 318, and a new wireless access point 320. The device 102 may determine that since a new wireless access point 320 has been detected, and the original wireless access point 308 can no longer be detected, the device 102 must have been moved to a new network 312. In an example, the service provider may select that the "moved" criteria comprise the absence of four out of the top five devices in the original data indicative of the devices connected to the network. For example, although the device 102 may still detect the mobile phone 310, the device 102 may determine that at least four of the five devices it detected when it was connected to the first network 105 can no longer be detected, and thus, the device 102 may determine that it has been moved to a new network 312. The above scenarios are merely examples of the "moved" criteria, wherein the "moved" criteria may include any combination thereof as selected by the service provider based on historical data analysis.

Figure 4:
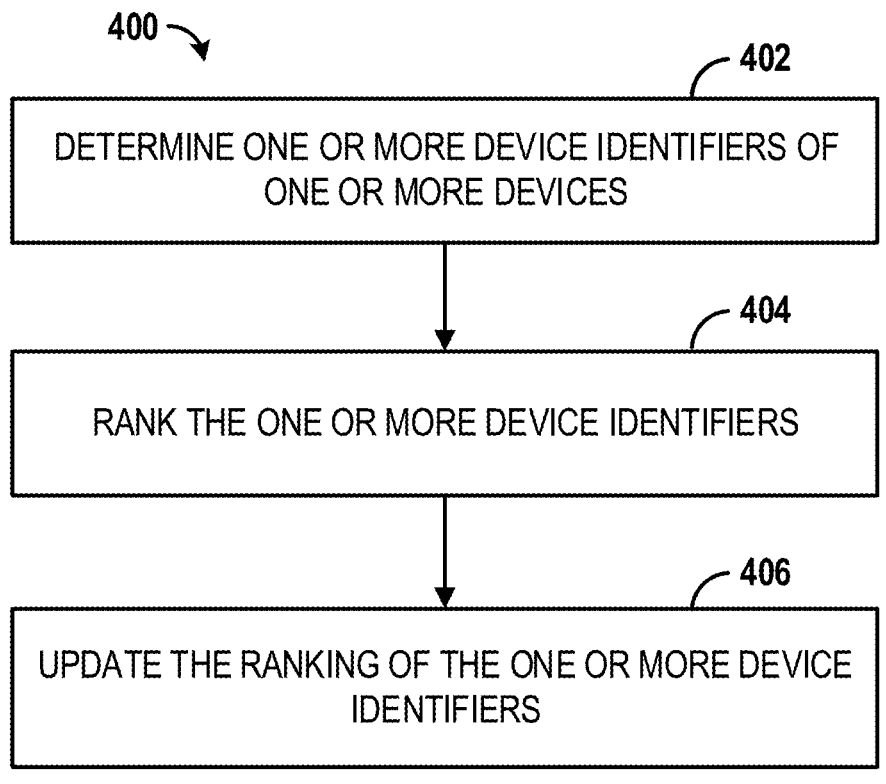
FIG. 4 shows a flowchart of an example method.

FIG. 4 shows an example method 400 for determining and maintaining the data indicative of the devices connected to the network. Method 400 may be implemented by the device 102, any of the network devices 116A-116D, or any combination thereof. At step 402, one or more device identifiers of one or more devices in communication with a first gateway device associated with a first network during a first time period may be determined. As an example, a network device may monitor ARP or NDP messages on the first network to determine the device identifiers of the network devices currently connected to the first gateway device associated with the first network. The device identifiers may comprise MAC addresses, international mobile equipment identity (IMEI) numbers, international portable equipment identity (IPEI) numbers, or unique device identifiers of the devices connected to the first network. As an example, the network device may periodically ping the one or more devices in communication with the first gateway device to determine the device identifiers of the one or more devices currently in communication with the first gateway device. As an example, the network device may cause an echo exchange of the one or more devices in communication with the first gateway device to determine the device identifiers of the one or more devices currently in communication with the first gateway device. As an example, the network device may determine the one or more device identifiers of the one or more devices currently in communication with the first gateway device based on the receipt or transmission of data by the one or more device. As an example, the network device may perform a presence check of the one or more devices in communication with the first gateway device to determine the device identifiers of the one or more devices currently in communication with the first gateway device. As an example, the network device may determine the device identifiers of the one or more devices currently in communication with the first gateway device based on logging into the first gateway device.

At step 404, the device identifiers that are detected during the first time period may be ranked. For example, the device identifiers may be ranked based on the number of times the device identifiers are determined to be present during the first time period. For example, if a printer is detected 10 times during the first period, a security camera is detected 7 times during the first time period, and a WiFi speaker is detected 5 times during the first time period, the printer may be ranked first, the security camera may be ranked second, and the WiFi speaker may be ranked third. These top ranked devices may be considered the usual neighbors of the current network. In an example, the network device may store the ranked group of device identifiers in persistent memory such that the group will not be erased when the network device reboots.

At step 406, the ranking of the detected device identifiers may be updated based on determining a number of times each device identifier is determined to be present during a second time period. For example, another device, such as a smart assistant device may be detected 11 times during the second time period, and thus, advance to the top of the ranked group of device identifiers, especially if the previously detected printer, security camera, and WiFi speaker are detected the same number of times during the second time period as during the first time period.

Additional device identifiers of one or more additional devices may be determined based on an event. For example, after a reboot event or a power cycle event, the network device may detect new, or additional, device identifiers. The event may further comprise the detection of a new device identifier. In an example, the network device may now detect a new printer or a network TV is connected to the current network. The network device may determine that it has been moved to a new network based on the newly detected device identifiers. As an example, the network device may determine that the originally ranked devices can no longer be detected on the current network. As an example, the network device may determine that a wireless access point detected during the first time period can no longer be detected during the second time period.

FIG. 5 shows an example method 500 for determining and maintaining the data indicative of devices connected to the network. Method 500 may be implemented by the device 102, any of the network devices 116A-116D, or any combination thereof. At step 502, one or more device identifiers of one or more devices in communication with a first gateway device associated with a first network during a first time period may be determined. For example, the network device may monitor ARP or NDP messages on the first network to determine the device identifiers of the network devices currently connected to the first gateway device associated with the first network. The device identifiers may comprise MAC addresses, international mobile equipment identity (IMEI) numbers, international portable equipment identity (IPEI) numbers, or unique device identifiers of the user devices connected to the first network. As an example, the network device may periodically ping the one or more devices in communication with the first gateway device to determine the device identifiers of the one or more devices currently in communication with the first gateway device. As an example, the network device may cause an echo exchange of the one or more devices in communication with the first gateway device to determine the device identifiers of the one or more devices currently in communication with the first gateway device. As an example, the network device may determine the one or more device identifiers of the one or more devices currently in communication with the first gateway device based on the receipt or transmission of data by the one or more device. As an example, the network device may perform a presence check of the one or more devices in communication with the first gateway device to determine the device identifiers of the one or more devices currently in communication with the first gateway device. As an example, the network device may determine the device identifiers of the one or more devices currently in communication with the first gateway device based on logging into the first gateway device.

At step 504, at least one identifier of the one or more identifiers determined to be present during the first time period may be determined based on a number of times each identifier of the one or more identifiers is determined to be present during the first time period. For example, the device identifiers that are determined to be present during the first time period may be ranked. The device identifiers may be ranked based on the number of times the device identifiers are determined to be present during the first time period. For example, if a printer is detected 10 times during the first period, a security camera is detected 7 times during the first time period, and a WiFi speaker is detected 5 times during the first time period, the printer may be ranked first, the security camera may be ranked second, and the WiFi speaker may be ranked third. These devices may be considered the usual neighbors of the current network. In an example, the network device may store the ranked group of device identifiers in persistent memory such that the group will not be erased when the network device reboots.

At step 506, additional device identifiers of one or more additional devices may be determined based on an event. For example, after a reboot event or a power cycle event, the network device may detect new, or additional, device identifiers. The event may further comprise the detection of a new device identifier. In an example, the network device may now detect a new printer or a network TV is connected to the network.

At step 508, the network device may determine that it has been moved to a new network based on the newly detected device identifiers. As an example, the network device may determine that the originally ranked devices can no longer be detected on the current network. As an example, the network device may determine that a wireless access point detected during the first time period can no longer be detected during the second time period. In an example, a service associated with the network device may be updated based on determining that the network device has moved to a new network. For example, at least one of a 911 service address associated with the network device or a subscription service associated with the network device may be updated based on the new network.

Figure 6:
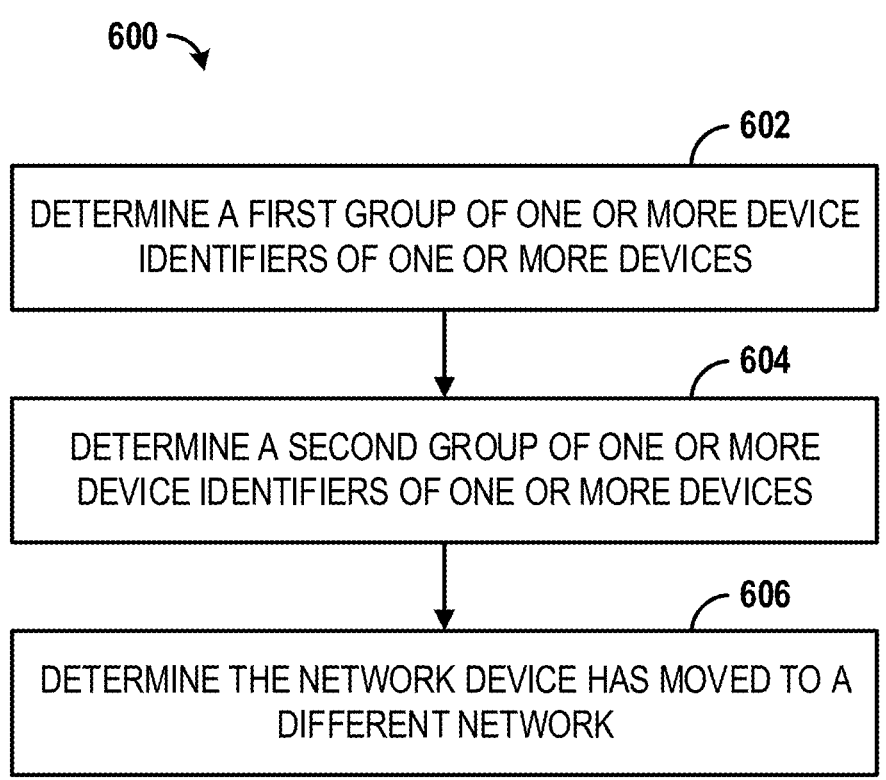
FIG. 6 shows a flowchart of an example method.

FIG. 6 shows an example method 600 for determining and maintaining the data indicative of the devices connected to the network. Method 600 may be implemented by the device 102, any of the network devices 116A-116D, or any combination thereof. At step 602, a first group of device identifiers of one or more user devices in communication with a first gateway device associated with a first network may be determined. For example, the network device may monitor ARP or NDP messages on the first network to determine the device identifiers of the network devices currently connected to the first gateway device associated with the first network. The device identifiers may comprise MAC addresses, international mobile equipment identity (IMEI) numbers, international portable equipment identity (IPEI) numbers, or unique device identifiers of the user devices connected to the first network. As an example, the network device may periodically ping the one or more devices in communication with the first gateway device to determine the device identifiers of the one or more devices currently in communication with the first gateway device. As an example, the network device may cause an echo exchange of the one or more devices in communication with the first gateway device to determine the device identifiers of the one or more devices currently in communication with the first gateway device. As an example, the network device may determine the one or more device identifiers of the one or more devices currently in communication with the first gateway device based on the receipt or transmission of data by the one or more device. As an example, the network device may perform a presence check of the one or more devices in communication with the first gateway device to determine the device identifiers of the one or more devices currently in communication with the first gateway device. As an example, the network device may determine the device identifiers of the one or more devices currently in communication with the first gateway device based on logging into the first gateway device. In an example, the first group of device identifiers may be stored in persistent memory such that the group will not be erased when the network device reboots.

At step 604, a second group of device identifiers of the one or more devices may be determined based on an event. The event may comprise a power cycling event, a reboot event, or that the network device has detected a new device identifier. At step 606, the network device may determine that it has moved to a second network via a second gateway device based on comparing the first group of device identifiers with the second group of device identifiers. For example, the network device may determine that device identifiers of the second group do not match the device identifiers of the first group or that the top three devices of the first group are not the top three devices of the second group. Based on the device identifiers of the second group not matching the device identifiers of the first group, the network device may determine that it is connected to a new network. In an example, a service associated with the network device may be updated based on determining that the network device has moved to a new network. For example, at least one of a 911 service address associated with the network device or a subscription service associated with the network device may be updated based on the new network.

Figure 7:
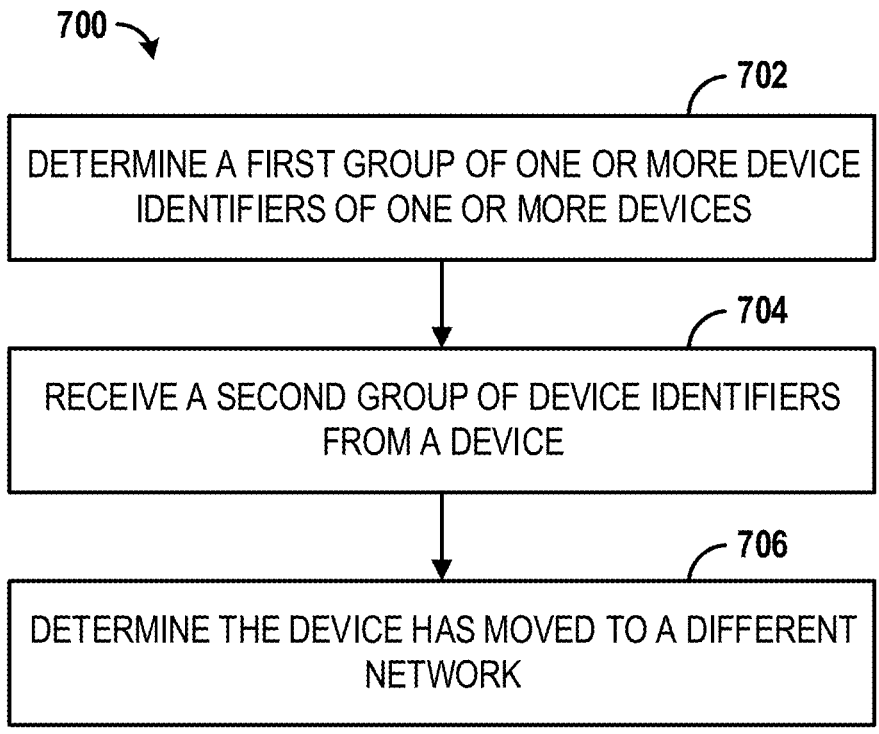
FIG. 7 shows a flowchart of an example method.

FIG. 7 shows an example method 700 for determining and maintaining the data indicative of the devices connected to the network by a gateway device, a wireless access point, or a server. Method 700 may be performed by the computing device 105, any of the network devices 116A-116D acting as a gateway device or a wireless access point, or any combination thereof. At step 702, a first group of one or more device identifiers of one or more devices connected to a network during a first time period may be determined. For example, the gateway device may monitor ARP or NDP messages on its network to determine the device identifiers of the devices currently in communication with the gateway device. The device identifiers may comprise MAC addresses, international mobile equipment identity (IMEI) numbers, international portable equipment identity (IPEI) numbers, or unique device identifiers of the devices connected to the gateway device. As an example, the network device may periodically ping the one or more devices in communication with the first gateway device to determine the device identifiers of the one or more devices currently in communication with the first gateway device. As an example, the network device may cause an echo exchange of the one or more devices in communication with the first gateway device to determine the device identifiers of the one or more devices currently in communication with the first gateway device. As an example, the network device may determine the one or more device identifiers of the one or more devices currently in communication with the first gateway device based on the receipt or transmission of data by the one or more device. As an example, the network device may perform a presence check of the one or more devices in communication with the first gateway device to determine the device identifiers of the one or more devices currently in communication with the first gateway device. As an example, the network device may determine the device identifiers of the one or more devices currently in communication with the first gateway device based on logging into the first gateway device. In an example, the first group of device identifiers may be stored in persistent memory such that the group will not be erased in the event of a device reboot.

At step 704, a second group of device identifiers may be received from one of the devices connected to the network. For example, the gateway device may request a device's group of network devices in order to compare its group with the device's group for determining whether the device has moved to a new network. At step 706, the first group may be compared with the second group to determine whether the device has moved to a new network. For example, the gateway device may determine that device identifiers of its group do not match the device identifiers of the device's group, and thus, the device has been moved from another network to the gateway device's network. For example, the gateway device may determine that the top three devices of the first group are not the top three devices of the second group, and thus, the device has been moved from another network.

FIG. 8 shows an example method 800 for determining and maintaining the data indicative of the devices connected to the network by a gateway device, a wireless access point, or a server. Method 800 may be performed by the computing device 105, any of the network devices 116A-116D acting as a gateway device or a wireless access point, or any combination thereof. At step 802, a first group of device identifiers of one or more devices connected to a network during a first time period may be determined. For example, the gateway device may monitor ARP or NDP messages on its network to determine the device identifiers of the devices currently in communication with the gateway device. The device identifiers may comprise MAC addresses, international mobile equipment identity (IMEI) numbers, international portable equipment identity (IPEI) numbers, or unique device identifiers of the user devices connected to the gateway device. As an example, the network device may periodically ping the one or more devices in communication with the first gateway device to determine the device identifiers of the one or more devices currently in communication with the first gateway device. As an example, the network device may cause an echo exchange of the one or more devices in communication with the first gateway device to determine the device identifiers of the one or more devices currently in communication with the first gateway device. As an example, the network device may determine the one or more device identifiers of the one or more devices currently in communication with the first gateway device based on the receipt or transmission of data by the one or more device. As an example, the network device may perform a presence check of the one or more devices in communication with the first gateway device to determine the device identifiers of the one or more devices currently in communication with the first gateway device. As an example, the network device may determine the device identifiers of the one or more devices currently in communication with the first gateway device based on logging into the first gateway device.

At step 804, the first group of device identifiers may be output. For example, a device may send an initial request for a group of network devices in communication with the gateway device when the device initially connects to the gateway device, wherein the gateway device may provide the first group of device identifiers to the device.

At step 806, a second group of device identifiers may be determined based on an event. The event may comprise at least one of a reboot event of the gateway device, a power cycling event of the gateway device, or that the gateway device has determined a new device identifier of a new user device.

At step 808, the second group of device identifiers may be output. For example, the device may send a second request for a group of network devices in communication with the gateway device, wherein the gateway device may provide the second group of device identifiers to the device.

At step 810, the device may generate a report based on comparing the second group of device identifiers to the first group of device identifiers. For example, the device may compare the second group of device identifiers with the first group of device identifiers and determine whether or not the device has moved to a new network. For example, the user device may determine that the device identifiers of the two groups do not match or that the top three devices of the first group are not the top three devices of the second group, and thus, the device has been moved to a new network. The device may send a report indicating the results of the comparison to the gateway device.

Figure 9:
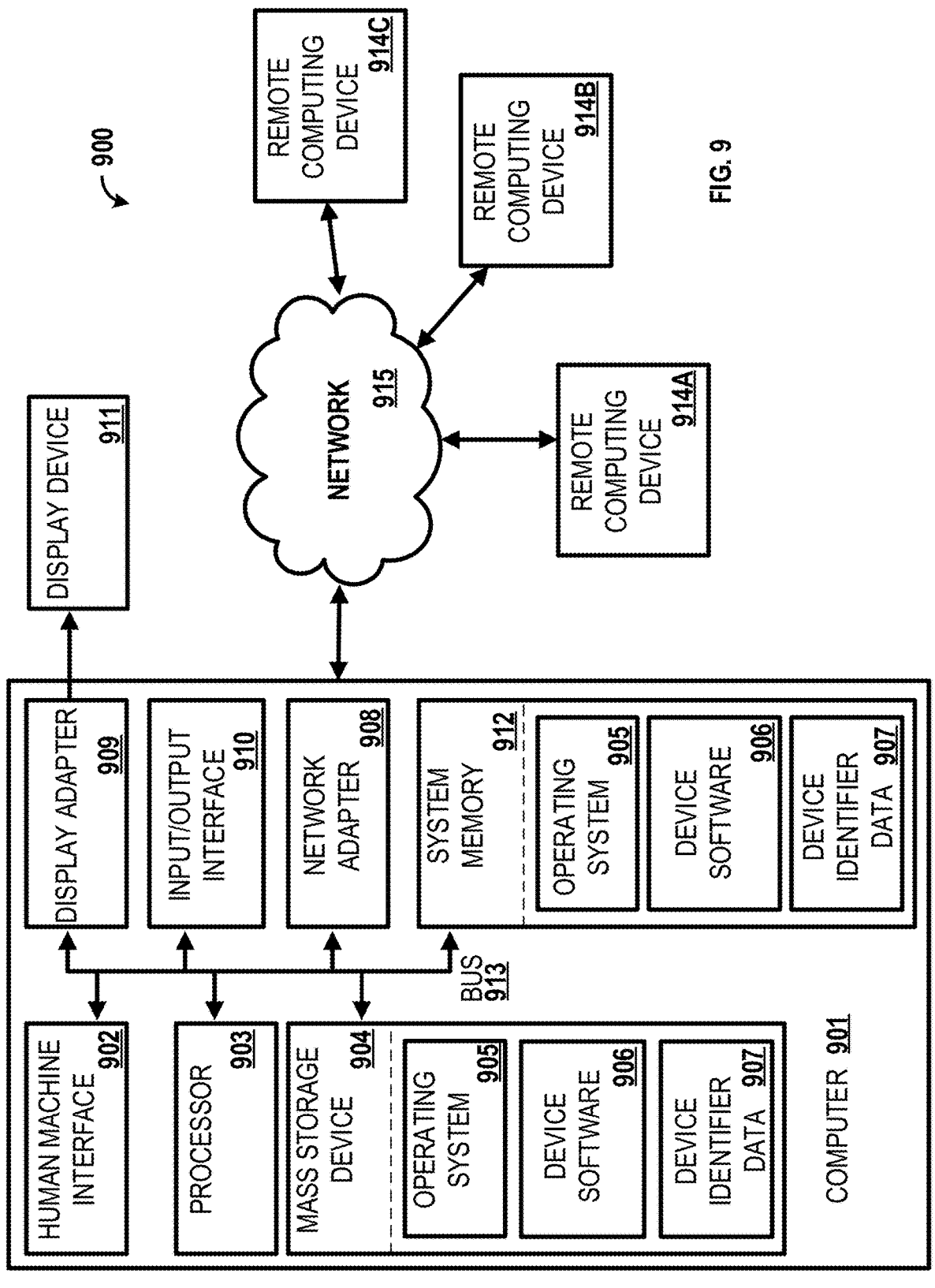
FIG. 9 shows a block diagram of an example system and computing device.

The methods and systems may be implemented on a computer 901 as shown in FIG. 9 and described below. By way of example, computing device 104, device 102, and/or one or more of the network devices 116A-116D of FIG. 1 can be a computer 901 as illustrated in FIG. 9. Similarly, the methods and systems disclosed can utilize one or more computers to perform one or more functions in one or more locations. FIG. 9 shows a block diagram of an example operating environment 900 for performing the disclosed methods. The operating environment 900 is an example of an operating environment and is not intended to suggest any limitation as to the scope of use or functionality of operating environment architecture. Neither should the operating environment 900 be interpreted as having any dependency or requirement relating to any one or combination of components in the operating environment 900.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, and/or the like that perform particular tasks or implement particular abstract data types. The disclosed methods can also be practiced in grid-based and distributed computing environments where tasks are performed by remote processing devices that are linked through a communications network. In a distributed computing environment, program modules can be located in local and/or remote computer storage media such as memory storage devices.

Further, one skilled in the art will appreciate that the systems and methods disclosed herein can be implemented via a general-purpose computing device in the form of a computer 901. The computer 901 can comprise one or more components, such as one or more processors 903, a system memory 912, and a bus 913 that couples various components of the computer 901 comprising the one or more processors 903 to the system memory 912. The system can utilize parallel computing.

The bus 913 can comprise one or more of several possible types of bus structures, such as a memory bus, memory controller, a peripheral bus, an accelerated graphics port, or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 913, and all buses specified in this description can also be implemented over a wired or wireless network connection and one or more of the components of the computer 901, such as the one or more processors 903, a mass storage device 904, an operating system 905, device software 906, device identifier data 907, a network adapter 908, the system memory 912, an Input/Output Interface 910, a display adapter 909, a display device 911, and a human machine interface 902, can be contained within one or more remote computing devices 914A-914C at physically separate locations, connected through buses of this form, in effect implementing a fully distributed system.

The computer 901 may comprise a variety of computer readable media. For example, readable media can be any available media that is accessible by the computer 901 and comprises, for example and not meant to be limiting, both volatile and non-volatile media, removable and non-removable media. The system memory 912 can comprise computer readable media in the form of volatile memory, such as random access memory (RAM), and/or non-volatile memory, such as read only memory (ROM). The system memory 912 typically can comprise data such as the device identifier data 907 and/or program modules such as the operating system 905 and the device software 906 that are accessible to and/or are operated on by the one or more processors 903.

The computer 901 may comprise other removable/nonremovable, volatile/non-volatile computer storage media. The mass storage device 904 can provide non-volatile storage of computer code, computer readable instructions, data structures, program modules, and other data for the computer 901. For example, the mass storage device 904 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 904, such as, by way of example, the operating system 905 and the device software 906. One or more of the operating system 905 and the device software 906 (or some combination thereof) can comprise elements of the programming and the device software 906. The device identifier data 907 can also be stored on the mass storage device 904. The device identifier data 907 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple locations within the network 915.

The user can enter commands and information into the computer 901 via an input device (not shown). Examples of such input devices comprise, but are not limited to, a keyboard, pointing device (e.g., a computer mouse, remote control), a microphone, a joystick, a scanner, tactile input devices such as gloves, and other body coverings, motion sensor, and the like These and other input devices can be connected to the one or more processors 903 via the human machine interface 902 that is coupled to the bus 913, but can be connected by other interface and bus structures, such as a parallel port, game port, an IEEE 1394 Port (also known as a Firewire port), a serial port, a network adapter 908, and/or a universal serial bus (USB).

The display device 911 may also be connected to the bus 913 via an interface, such as the display adapter 909. It is contemplated that the computer 901 can have more than one display adapter 909 and the computer 901 can have more than one display device 911. For example, the display device 911 can be a monitor, an LCD (Liquid Crystal Display), light emitting diode (LED) display, television, smart lens, smart glass, and/or a projector. In addition to the display device 911, other output peripheral devices can comprise components such as speakers (not shown) and a printer (not shown) which can be connected to the computer 901 via an Input/Output Interface 910. Any step and/or result of the methods can be output in any form to an output device. Such output can be any form of visual representation, comprising, but not limited to, textual, graphical, animation, audio, tactile, and the like. The display device 911 and the computer 901 can be part of one device, or separate devices.

The computer 901 can operate in a networked environment using logical connections to one or more remote computing devices 914A-914C. By way of example, a remote computing device 914A-914C can be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device or other common network node, and so on. Logical connections between the computer 901 and a remote computing device 914A-914C can be made via a network 915, such as a local area network (LAN) and/or a general wide area network (WAN). Such network connections can be through the network adapter 908. The network adapter 908 can be implemented in both wired and wireless environments. Such networking environments are conventional and commonplace in dwellings, offices, enterprise-wide computer networks, intranets, and the Internet.

For purposes of illustration, application programs and other executable program components such as the operating system 905 are illustrated herein as discrete blocks, although it is recognized that such programs and components can reside at various times in different storage components of the computing device 901, and are executed by the one or more processors 903 of the computer 901. An implementation of the device software 906 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" may comprise volatile and non-volatile, removable and non-removable media implemented in any methods or technology for storage of information such as computer readable instructions, data structures, program modules, or other data. For example, computer storage media may comprise RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ artificial intelligence (AI) techniques such as machine learning and iterative learning. Examples of such techniques comprise, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible nonexpress basis for interpretation, such as: matters of logic with respect to arrangement of steps or operational flow; plain meaning derived from grammatical organization or punctuation; the number or type of embodiments described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

What is claimed is:

1. A method comprising:
   determining, by a computing device, during a first time period, one or more identifiers of one or more user devices in communication with a first gateway device associated with a first network;
   generating data indicative of a ranking of each identifier of the one or more identifiers according to a number of times each identifier is identified during the first time period; and
   causing the data indicative of the ranking of each identifier to update according to a number of times each identifier is identified during a second time period.

2. The method of claim 1, wherein the one or more identifiers comprise at least one of MAC addresses, international mobile equipment identity (IMEI) numbers, international portable equipment identity (IPEI) numbers, or unique device identifiers.

3. The method of claim 1, wherein determining, by the computing device, during the first time period, the one or more identifiers of the one or more user devices in communication with the first gateway device associated with the first network comprises monitoring at least one of address resolution protocol messages, neighbor discovery protocol messages, or reverse address resolution protocol messages.

4. The method of claim 1, further comprising: determining, based on an event, additional identifiers of the one or more user devices.

5. The method of claim 4, further comprising: determining, based on the additional identifiers and the ranked identifiers, the computing device is in communication with a second gateway device associated with a second network.

6. The method of claim 4, wherein the event comprises at least one of a reboot of the computing device, determining a new identifier of a new user device, or a power cycling event of the computing device.

7. The method of claim 1, wherein the one or more user devices comprise at least one of a VoIP device, a laptop, a printer, a security camera, a smart assistant device, a WiFi speaker, or a router.

8. A method comprising:

determining, by a computing device, during a first time period, one or more identifiers of one or more user devices in communication with a first gateway device associated with a first network;

generating data indicative of a ranking of at least one identifier of the one or more identifiers according to a number of times each identifier of the one or more identifiers is identified during the first time period;

determining, based on an event, one or more additional identifiers of one or more additional user devices; and determining, based on the at least one identifier and the one or more additional identifiers, the computing device is in communication with a second gateway device associated with a second network.

9. The method of claim 8, wherein the one or more identifiers comprise at least one of MAC addresses, international mobile equipment identity (IMEI) numbers, international portable equipment identity (IPEI) numbers, or unique device identifiers.

10. The method of claim 8, wherein determining, during the first time period, the one or more identifiers of the one or more user devices in communication with the first gateway device associated with the first network comprises monitoring at least one of address resolution protocol messages, neighbor discovery protocol messages, or reverse address resolution protocol messages.

11. The method of claim 8, wherein determining, based on the at least one identifier and the one or more additional identifiers, the computing device is in communication with the second gateway device associated with the second network comprises determining, based on a comparison of the at least one identifier and the one or more additional identifiers, the computing device is in communication with the second gateway device associated with the second network.

12. The method of claim 8, wherein determining, based on the at least one identifier and the one or more additional identifiers, the computing device is in communication with the second gateway device associated with the second network comprises determining, based a threshold number of the one or more additional identifiers not matching the at least one identifier, the computing device is in communication with the second gateway device associated with the second network.

13. The method of claim 8, wherein the event comprises at least one of a reboot of the computing device, determining a new identifier of a new user device, or a power cycling event of the computing device.

14. The method of claim 8, further comprising: updating, based on the second network, at least one of a 911 service address associated with the computing device or a subscription associated with the computing device.

15. A method comprising:

determining, by a computing device, one or more identifiers of a first group of one or more user devices in communication with a first gateway device associated with a first network;

determining, based on an event, one or more identifiers of a second group of the one or more user devices; and determining, based on the one or more identifiers of the first group not matching the one or more identifiers of the second group, the computing device is in communication with a second gateway device associated with a second network.

16. The method of claim 15, wherein one or more of the one or more identifiers of the first group or the one or more identifiers of the second group comprise at least one of MAC addresses, international mobile equipment identity (IMEI) numbers, international portable equipment identity (IPEI) numbers, or unique device identifiers.

17. The method of claim 15, wherein one or more of the one or more identifiers of the first group or the one or more identifiers of the second group are determined based on monitoring at least one of address resolution protocol messages, neighbor discovery protocol messages, or reverse address resolution protocol messages.

18. The method of claim 15, wherein the one or more identifiers of the first group comprise highest ranked identifiers determined during a first time period, and wherein the one or more identifiers of the second group comprise highest ranked identifiers determined during a second time period.

19. The method of claim 15, wherein the one or more identifiers of the first group are determined based on a number of times the one or more identifiers of the first group are identified during a first time period, and wherein one or more identifiers of the second group are determined based on a number of times the one or more identifiers of the second group are identified during a second time period.

20. The method of claim 15, wherein the event comprises at least one of a reboot of the computing device, determining a new identifier of a new user device, or a power cycling event of the computing device.

* * * * *